US006448727B1

(12) United States Patent
Rotterhusen

(10) Patent No.: US 6,448,727 B1
(45) Date of Patent: Sep. 10, 2002

(54) MAINS BRAKING DEVICE FOR A LINE-POWERED POWER TOOL

(75) Inventor: Hans Hermann Rotterhusen, Tellingstedt (DE)

(73) Assignee: Metabowerke GmbH, Nurtingen (DE)

( * ) Notice: Subject to any disclaimer, the term of this patent is extended or adjusted under 35 U.S.C. 154(b) by 0 days.

(21) Appl. No.: 09/869,619

(22) PCT Filed: Jan. 5, 2000

(86) PCT No.: PCT/DE00/00039

§ 371 (c)(1),
(2), (4) Date: Jun. 29, 2001

(87) PCT Pub. No.: WO00/41294

PCT Pub. Date: Jul. 13, 2000

(30) Foreign Application Priority Data

Jan. 7, 1999 (DE) .......................................... 199 00 281
Jul. 14, 1999 (DE) .......................................... 199 32 742

(51) Int. Cl.[7] .............................................. H02P 3/12
(52) U.S. Cl. ...................... 318/375; 318/244; 318/381; 318/366
(58) Field of Search ................................. 318/366, 369, 318/375, 378, 258, 268, 269, 273, 293, 381, 244

(56) References Cited

U.S. PATENT DOCUMENTS

| | | | | |
|---|---|---|---|---|
| 3,798,523 A | * | 3/1974 | Gross .......................... 318/212 |
| 4,112,341 A | * | 9/1978 | Fath et al. ................... 318/370 |
| 4,250,436 A | * | 2/1981 | Weissman .................... 318/245 |
| 5,708,333 A | * | 1/1998 | Kirm .......................... 318/246 |
| 5,789,885 A | * | 8/1998 | Seel ........................... 318/375 |
| 5,994,860 A | * | 11/1999 | Krueger et al. ............. 318/527 |
| 6,037,729 A | * | 3/2000 | Woods et al. ............... 318/375 |
| 6,104,155 A | * | 8/2000 | Rosa .......................... 318/381 |

FOREIGN PATENT DOCUMENTS

| | | |
|---|---|---|
| DE | 1 225 223 | 9/1966 |
| DE | 23 48 880 | 4/1975 |
| DE | 35 11 895 | 10/1986 |
| DE | 15 88 380 | 1/1987 |
| JP | 07 0467 07 | 2/1995 |

* cited by examiner

Primary Examiner—Robert E. Nappi
Assistant Examiner—Rina I. Duda
(74) Attorney, Agent, or Firm—Young & Basile, PC

(57) ABSTRACT

A mains braking device for a line-powered power tool includes a circuit arrangement with a two-pole switch which switches between the motor mode and the braking mode. The inventive braking device further includes an electronic power circuit breaker or triac which is connected in series to the commutator motor of the power tool and with control electronics allocated to the triac. For the safe recognition and initiation of the mains braking mode, the control electronics is provided with devices for differentiating between the motor mode and the mains braking mode. The mains braking device is especially useful for power tools such as right angle grinders, hand-held buzz saws and the like which are provided with dangerous tools.

10 Claims, 2 Drawing Sheets

MAINS BRAKING DEVICE FOR A LINE-POWERED POWER TOOL

The invention relates to a main braking device for a line-powered hand tool, in accordance with claim 1.

Main-braked commutator motors are known in various layouts and technologies.

In DE-PS 15 88 380 an arrangement is described for reverse current braking of a DC series-wound motor, fed from a battery via a pulse control device, with two reversing contactors reversing the polarity of its field winding. By means of two diodes (D1, D2), each of which is permanently connected directly to the field winding by one contact (E, F), and by means of an actuator which operates the reversing contactors (1,2) sequentially in the correct order, the intent is to prevent switching sparks from being generated when the motor is shifted to reverse current braking. Reverse current braking serves primarily to brake the motor to a stop so that it can be run up to speed again in the opposite direction of rotation.

Reverse current braking of this type, as described in DE-PS 15 88 380, is not suitable for a line-powered power tool (angle grinder, manual circular saw) with a high power consumption, as the requisite devices for safe reverse current braking are not available.

DE-AS 12 25 223 describes a regenerative braking circuit for AC series-wound motors which are serially excited during braking, whose field excitation is polarity-reversed during braking by using means to limit braking current and to prevent self-excitation with non-main frequency. It employs a circuit configuration controlled by braking current, which interrupts the current direction of the decayed half-wave with each zero crossing of the regenerative braking current.

However, there is no application for a regenerative braking circuit of this type for power tools equipped with dangerous attachments. DE 23 48 880 B 2 describes an automatic washing machine drive with an electrically brakeable series-wound commutator motor, whose armature winding is by-passed during braking. The speed (rpm) of the series-wound motor can be controlled through a semi-conductor circuit configuration (1), and a switch is provided by which, when it is in its closed position, the armature winding (2) is by-passed and the field winding is also connected via the semi-conductor circuit configuration directly to the power main, and the field current can be changed by means of the semi-conductor circuit configuration.

Even the circuit configuration described in DE 23 48 880 is not suitable for a line-powered power tool, as the positive series-wound braking desirable in the case of power tools cannot be implemented by this method. The basic object of the invention is to create a main braking device for line-powered power tools, whereby high-power standard commutator motors can be braked safely by means of gentle high-speed braking in order to be able to use a main braking device of this type in a power tool fitted with a dangerous attachments, such as a manual circular saw, angle grinder, or similar.

This objective is achieved through the properties described under claim 1.

Additional configurations of the invention can be found in the sub-claims and the ensuing description.

In the case of an arrangement of the type described at the beginning, the invention can be seen in that adequate devices are assigned to the electronics of the line-powered power tool to enable the main for brake operation, and they are capable of positive identification to initiate brake operation, and also in that a speed detecting device is assigned to the commutator motor of the line-powered power tool which is used during motor operation and also during brake operation to identify the braking procedure and that the motor is not running, and in that the power on/off-switch for the line-powered power tool contains two two-way switches and a main disconnect, which are operated simultaneously through an actuator, where the main disconnect has an automatic mechanical disconnect delay for the braking period, or the main is disconnected by a relay after the braking process.

The invention is described in more detail subsequently through the embodiments presented in the drawings.

FIG. 1 shows a circuit configuration for main-dependent braking of a commutator motor, in which an electronic power switch is switched in series with the commutator motor during brake operation, FIG. 2 shows a circuit configuration for main-dependent braking of a commutator motor, in which an electronic power switch is switched in series with the commutator motor both during motor operation and during brake operation.

Commutator motors without reversing poles for power tools fitted with dangerous attachments have been braked until now with the aid of electronics independently of the main by means of short-circuit braking, in which adequate commutation during the braking process is dependent on the power of the motor, because the higher the power consumption of the commutator motor, the less adequate commutation can be achieved.

FIGS. 1 to 4 each shows a circuit configuration for a commutator motor with which main-dependent braking is feasible. The commutator motor, consisting of an armature 1 with assigned brushes 2, 2' and a field winding 3, is given an operating switch with two two-way contacts S1, S2 and a main disconnect S3 or a relay 10. The two-way contacts S1, S2 and the main disconnect S3 of the operating switch are wired in common via an actuator. The field winding 3 is always located between the first and the second two-way contacts S1; S2, where the armature 1 can also be located between the first and the second two-way contacts S1; S2.

Figure 1:
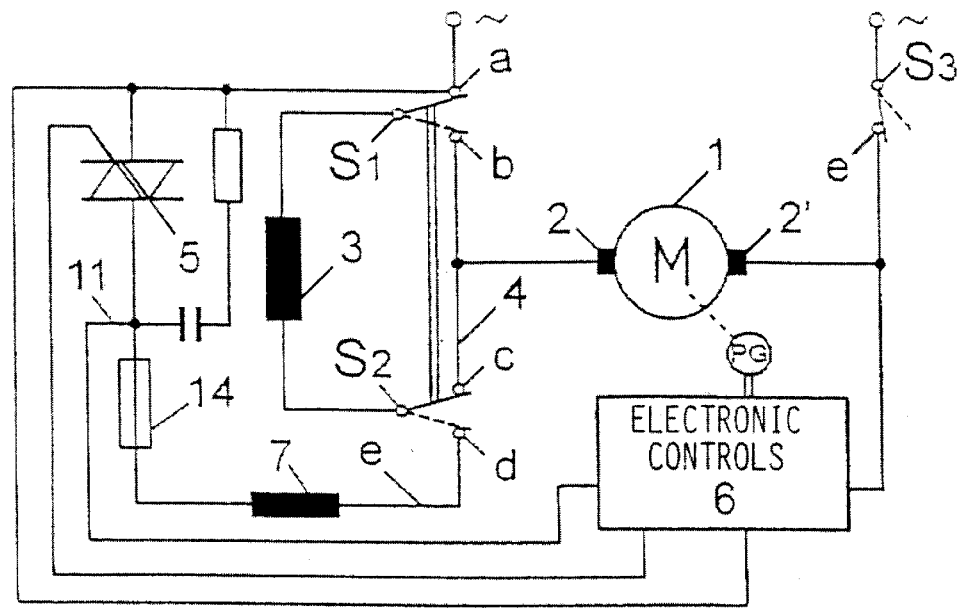

FIG. 1 shows a circuit configuration in detail in which the motor operation contact a of the first two-way contact S1 is connected to a first main two-way contact S2 and with the first terminal of the armature 1, and the brake operating contact d of the second two-way contact S2 is connected via an electronic power switch 5 (triac) to the motor operating contact a of the first two-way contact S1 and to the first main connection. The second terminal of the armature 1 is connected to the motor operating contact e of the main disconnect S3, where the main disconnect S3 is connected to the second connection.

If the commutator motor is switched off, the shift is made from motor operation to brake operation, when the polarity of the field winding 3 or the armature 1 is reversed via the two-way contacts S1; S2, when the triac 5 is switched in series with the commutator motor. Electronic controls 6 are assigned to the triac 5 to control the braking current taken from the main.

For the braking process, the electronic controls 6 are designed in such a way that motor braking is initiated gently and becomes harder continuously until the conclusion of the braking process, by which gentle rapid braking of the commutator motor is achieved with adequate commutation. For the braking process, the electronic controls 6 can contain a device for detecting when the motor is not running or a timer for braking time. After completion of the braking process, the commutator motor is disconnected from the main by means of the disconnect S3. The main disconnect S3 can be time-delay switched via a mechanical device or via an electronic device, which is connected to the electronic controls 6. The time-delayed main disconnection lasts until the motor has come to a stop. As soon as the motor is stationary, the triac 5 is locked out, by which the current flow through the motor is interrupted, and immediately afterwards the motor is disconnected from the main by the disconnect S3.

One way the triac 5 can be activated during brake operation by the electronic controls 6 assigned to the triac is that at the beginning of the braking procedure one or several cut or non-cut half-waves from the main are pushed through one after the other, and then a number of half-waves are not pushed through, and in the subsequent course of the braking process the half-waves which were not pushed through are continuously reduced.

Another way the triac 5 can be activated during the braking process is that at the beginning of the braking procedure the half-waves have a high cut, and in the further course of the braking process the cut of the half waves, depending on the least amount of brush sparking to be achieved, decreases continuously up to the end of the braking process, when braking current is low at the beginning, then increases and remains constant over a specific period and continues to increase at the end of the braking period, where the amount of braking current during the braking procedure is dependent on the least amount of brush sparking to be achieved at the commutator motor collector.

The triac 5 is preferably wired in series with a retardation coil 7, by which method a too rapid increase in voltage at the triac 5 and thus overhead sparking of the triac during the switch from motor operation to brake operation can be prevented.

Figure 2:
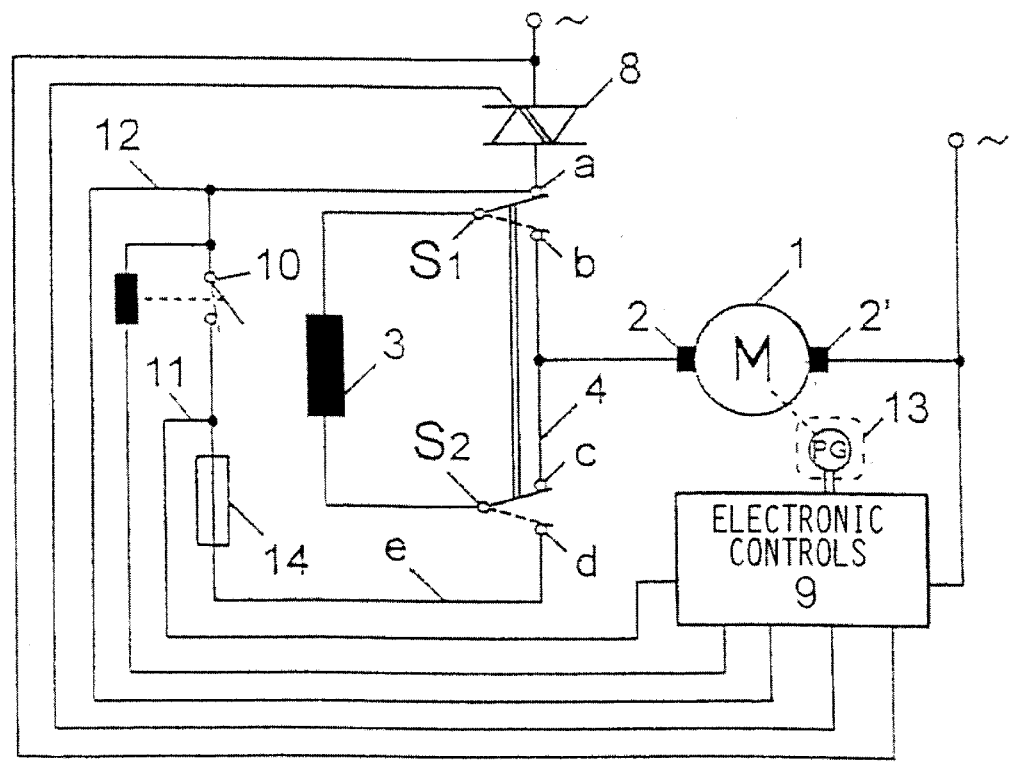

In the circuit configuration in FIG. 1 an electronic power switch (triac 5) is active only during the braking process. FIG. 2 shows a circuit configuration in which an electronic power switch, a triac 8, comes into operation both during motor operation as well as during brake operation. The triac 8 is permanently in series with the commutator motor. Electronic controls 9 are allocated to the triac 8 and they are intended both for motor speed (rpm) control as well as for controlling braking action in the event of main-dependent motor braking. The two-way contacts S1; S2 in the circuit configuration are in the motor operating position. If the commutator motor is switched off, the electronic controls 9, the two-way contacts are actuated and the field winding 3 has its polarity reversed, which initiates main-dependent braking of the motor. The switch from motor operation to brake operation must be positively identified by the electronic controls 9. If the triac 8 is not activated promptly with the brake program in the electronic controls, the main is short-circuited directly through the motor, since unlimited current can flow in the braking circuit (generator function).

In order to identify the initiation of brake operation positively, the bridge e, which connects the brake operation contact d of the second two-way contact S2 with the motor operation contact a of the first two-way contact S1, contains a relay 10, which is connected to the electronic controls 9 and which serves to enable the main during braking operation.

So that the electronic controls 9 positively recognize the switch from motor operation to brake operation, a lead 11 runs from the electronic controls 9 to brake operation contact d of the second two-way contact S2. As soon as voltage is present at brake operation contact d, the brake operation program in the electronic controls is activated and the main is enabled via the relay 10, and the triac 8 is triggered with the brake program. When the braking process is complete the triac is locked out, and the commutator motor is disconnected from the main via the relay 10. The relay is always switched load-free.

In order to identify positively that motor operation has started, a lead 12 runs from the electronic controls 9 to motor operation contact a of the first two-way contact S1. When motor operation is switched on, voltage is present at motor operation contact a, which activates the motor operation program in the electronic controls 9.

To set the speed (rpm) of the commutator motor and to recognize when the motor is stopped, an appropriate device for measuring speed (rpm) can be assigned to the armature The speed measurement device is connected to the electronic controls and it comes into use during motor operation as well as during brake operation.

So that the main cannot short-circuit across the motor following a failure of the braking electronics and the motor does not brake to a halt abruptly, a fuse 14 is connected in series with the motor during brake operation.

Figure 3:
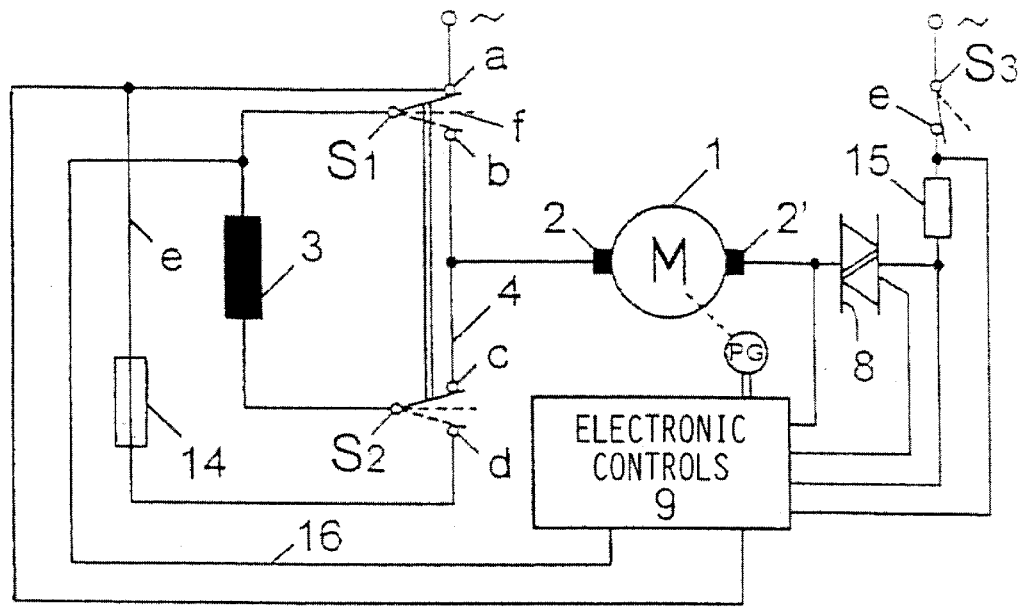
FIG. 3 shows an alternative circuit configuration for main-dependent braking of a commutator motor as shown in FIG. 2.

FIG. 3 shows a circuit configuration in which both motor operation and brake operation are carried out via the triac 8. In order to positively identify the initiation of brake operation, the reversing switch is designed in such a way that the two-way contacts S1 and S2 briefly remain stopped in the halfway position during the switch from motor operation to brake operation, thus interrupting current flow through the triac 8 for the time the two-way contacts remain stopped in the half-way position f This condition can be identified by the electronic controls 9 over a shunt 15, by which motor operation program is ended and brake operation program is activated. So that the electronic control circuits 9 positively identify when the switch occurs from motor operation or brake operation, a lead 16 runs from the electronic controls 9 to the first two-way contact S1. For brake operation the transfer switch is wired so that the brake operation contact d of the second two-way switch S2 is connected to the motor operation contact a of the first two-way switch S1 via the bridge e.

Figure 4:
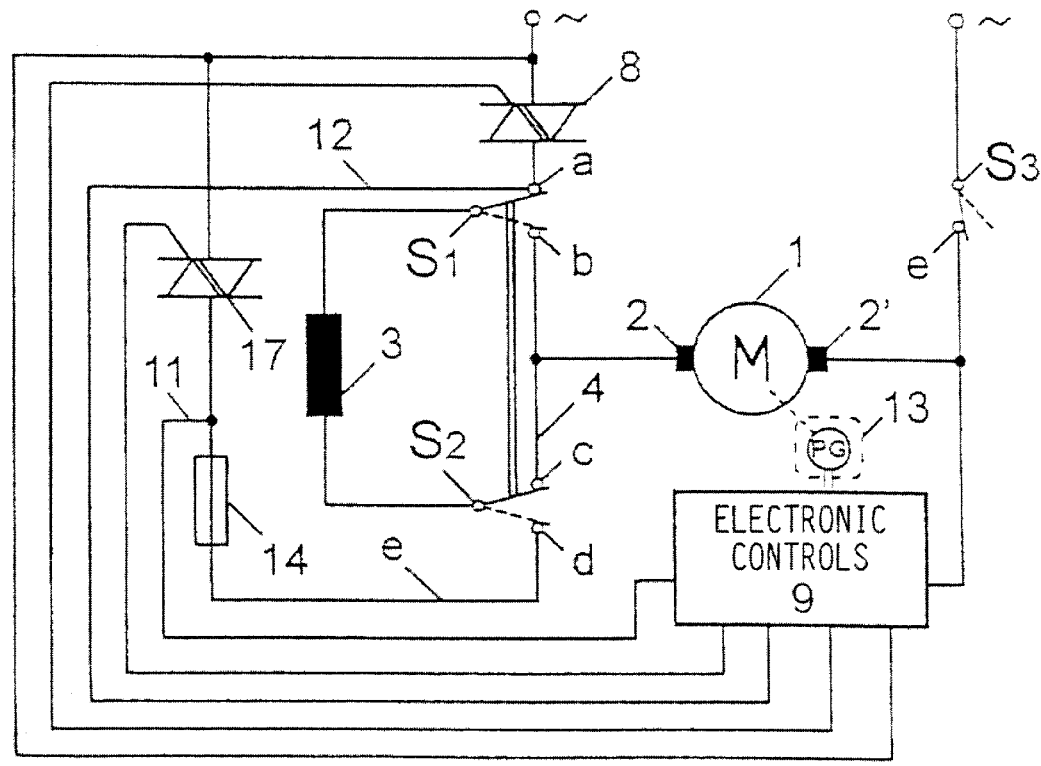
FIG. 4 shows a circuit configuration for main-dependent braking of a commutator motor, in which two electronic power switches are wired in parallel, whereby one of the electronic power switches is intended for motor operation and the other electronic power switch is intended for brake operation.

FIG. 4 shows a circuit configuration in which only motor operation takes place over the first triac 8 and only brake operation takes place over a second triac 17. The first and the second triac 8; 17 in each case is attached with the first triac terminal to the main terminal leading to the motor operation contact a of the first two-way contact, where the other triac terminal of the first triac 8 is attached to the motor operation contact a of the first two-way contact S1, and the other triac terminal of the second triac 17 is attached to the brake operation contact d of the second two-way contact S2. The identification of motor operation and of brake operation, as well as the program for motor operation and brake operation is the same as the description for FIG. 2.

Triggering of the triac 8; 17 during brake operation through the electronic controls 9 in FIGS. 2, 3, 4 is the same as the triggering process from FIG. 1. After the braking process is complete, the current flow over the commutator motor is blocked by the triacs 8; 17 and afterwards the motor is disconnected from the main by means of the main disconnect S3, or a relay 10.

The figures show in each case a circuit configuration for alternating current operation. The circuit layouts can also be designed for direct current operation, by replacing the triac with a transistor and designing the electronic control circuits for the triac as a pulse width modulator. The wiring and the method of operation of the circuit layouts are the same for direct current operation as for alternating current.

What is claimed is:

1. A mains braking device for a line-powered power tool with a commutator motor and a circuit configuration having a double-pole transfer switch shifting between motor and brake operation with a first and a second two-way contact for reversing the polarity of the field or armature winding and with a triac, which is wired in series with the commutator motor, and with electronic controls allocated to the triac, characterized in that for positive initiation of the mains braking process, both the motor operation switch position as well as the line braking switch position of the double-pole transfer switch are positively identified by the electronic controls, wherefor a first lead runs from the electronic controls to the terminal of a motor operation contact of the first two-way contact and a second lead runs from the electronic controls to a brake operation contact of a second two-way contact to determine main voltage at these contacts, wherein, with main voltage being present at the motor operation contact of the first two-way contact, motor operation is activated via the electronic controls, and when main voltage is present at the brake operation contact of the second two-way contact, main braking operation is activated via the electronic controls.

2. The mains braking device in accordance with claim 1, wherein a bridge for mains braking operation is wired between the brake operation terminal of the second two-way contact and the mains contact leading to the motor operation terminal of the first two-way contact, wherein one of a triac and a relay can be located in the bridge.

3. The mains braking device in accordance with claim 1, wherein to detect the shift from motor operation to brake operation, a transfer switch has two-way contacts remain briefly in a half-way position during the switchover from motor operation to brake operation, and the resulting no-voltage status at the two-way contact is detected by the electronic controls over a third lead, whereby the motor operation program is terminated and the brake operation program is activated.

4. The mains braking device in accordance with claim 1, wherein motor operation is managed by a first triac and brake operation by a second triac, where the first and second triacs are attached in each case with one triac terminal to a main terminal leading to the motor operation contact of the first two-way contact, and another triac terminal of the first triac is attached to the motor operation contact of the first two-way contact and another triac terminal of the second triac is attached to the brake operation contact of the second two-way contact.

5. A mains braking device for a line-powered power tool with a commutator motor and a circuit configuration with a double-pole transfer switch shifting between motor and brake operation with a first and a second two-way contact for reversing the polarity of one of a field winding and an armature winding and with a triac, which is wired in series with the commutator motor and with electronic controls coupled to the triac, wherein for positive initiation of the main braking process both the motor operation switch position and the main braking switch position of the two-pole transfer switch are positively identifiable by the electronic controls, where a lead runs from the electronic controls to the brake operation contact of the second two-way contact to determine line voltage at this contact, and where, when line voltage is present at the brake operation contact of the second two-way contact, main braking operation is activated through the electronic controls.

6. The mains braking device in accordance with claim 5, wherein a device is allocated to the commutator motor of the line-powered hand tool to register speed, which device is in contact with the electronic controls, where the device for registering speed has an application both during motor operation and brake operation, and to detect when the motor is stopped.

7. The mains braking device in accordance with claim 5, wherein the triac is activated during brake operation in such a way that at the start of brake operation half waves exhibit a high cut and, in the further course of brake operation, the cut of the half waves decreases continuously depending on the least amount of brush sparking to be achieved, so that braking current is lower at the outset, then rises and remains constant over a period of time and rises once more at the end of the braking period.

8. The mains braking device in accordance with claim 5, wherein a fuse is wired in series with the motor during brake operation.

9. The mains braking device in accordance with claim 5, wherein a main disconnect delays disconnection from the mains during brake operation until the motor has come to a stop, where the main disconnect delays switching by one of a mechanical device and an electronic device, and the disconnection from the main is carried out over a relay, which is located in the bridge connecting the brake operation contact of the second reversing element with the motor operation contact of the first reversing element, where the relay is always switched load-free by means of the electronic controls.

10. The mains braking device in accordance with claim 5, wherein the circuit configuration and the electronic controls are designed for direct-current operation, and the triac is replaced by a transistor, and the electronic control circuits contain a pulse width modulator.

* * * * *